United States Patent [19]

Piccirilli et al.

[11] 4,429,084

[45] Jan. 31, 1984

[54] METHOD FOR FORMING A GROUT COMPOSITION

[76] Inventors: Daniel M. Piccirilli; David M. Piccirilli, both of 3480 Commerce Rd., Orchard Lake, Mich. 48033

[21] Appl. No.: 492,931

[22] Filed: May 9, 1983

[51] Int. Cl.³ ............................................. C08F 2/10
[52] U.S. Cl. ................................. 526/88; 526/303.1; 526/306; 526/307.2; 526/307.3; 524/827; 524/829; 524/800; 524/804
[58] Field of Search ............... 523/353; 524/829, 812, 524/827, 800, 804; 526/303.1, 306, 307.2, 307.3, 88, 81

[56] References Cited

U.S. PATENT DOCUMENTS

| | | | |
|---|---|---|---|
| 2,539,395 | 1/1951 | Banks | 252/93 |
| 2,609,362 | 9/1952 | Fryling et al. | 526/81 |
| 2,618,384 | 11/1952 | Hatfield | 206/54 |
| 3,002,960 | 10/1961 | Kolodny | 526/303.1 |
| 3,892,905 | 7/1975 | Albert | 428/220 |
| 4,059,552 | 11/1977 | Zweig et al. | 526/306 |
| 4,172,066 | 10/1979 | Zweig et al. | 524/829 |
| 4,248,348 | 2/1981 | Butler et al. | 206/447 |
| 4,324,592 | 4/1982 | Patel et al. | 106/85 |
| 4,357,961 | 11/1982 | Chick | 138/97 |

*Primary Examiner*—Paul R. Michl
*Assistant Examiner*—Alex H. Walker
*Attorney, Agent, or Firm*—Basile, Weintraub & Hanlon

[57] ABSTRACT

A method for forming a grout composition from multiple components. A first component is mixed in pre-measured amounts along with water in a first mixing tank. A first catalyst is added in pre-measured quantities to the first mixing tank. A second catalyst is mixed in pre-determined quantities with water in a second mixing tank. The aqueous solutions in the first and second mixing tanks are combined to cause a polymerization-cross-linking reaction of the first component which results in gellation of the first component.

7 Claims, 1 Drawing Figure

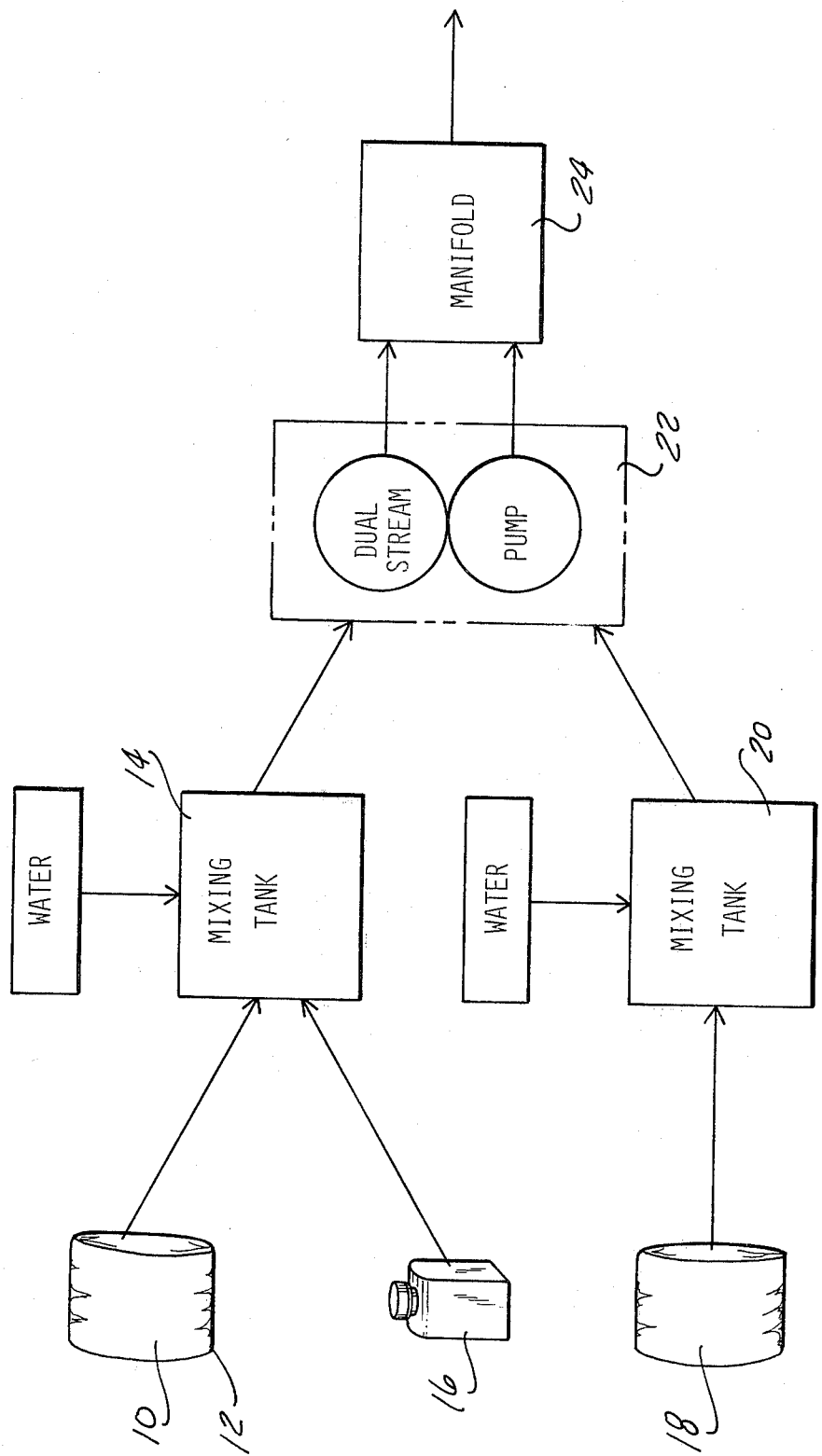

METHOD FOR FORMING A GROUT COMPOSITION

BACKGROUND OF THE INVENTION

1. Field of the Invention

This invention relates, in general, to grout compositions and, more specifically, to methods for forming grout compositions.

2. Description of the Prior Art

Multi-component grout compositions find widespread use in sealing defects, holes, leaks, etc. in various objects, such as underground pipes, and also to stabilize soil. Such compositions are formed by initially pre-mixing each component, which is typically in a powdered form, with water and combining the two aqueous solutions in a mixing chamber to cause a polymerization reaction of one of the components which causes the one component to solidify to a solid or semi-solid state as the combined mixtures are injected around an object.

However, problems have arisen in forming such grout compositions due to the toxicity of certain components which are used in forming such grout compositions. One grout component which is particularly useful in forming grout compoistions is an acrylamide mixture ($C_3H_5NO$) which is a mixture of two organic monomers: acrylamide and N, N-Methlynenebisacrylamide. This material is sold in a finely-divided powdered form and is known to be highly toxic and can cause paralysis if it contacts the respiratory system of a user. Due to the presence of airborn particles which are generated during its handling, respirators and rubber gloves have been required to be worn by the user to prevent contact with the toxic component.

Another problem encountered in forming grout composition is the accuracy of measuring precise quantities of various components used to form the grout composition. Obviously, inaccurate measurements alter the characteristics of the grout composition and could detract from its intended function.

Thus, it would be desirable to provide a method for forming a grout composition which overcomes the problems of previously devised methods for forming grout compositions. It would also be desirable to provide a method for forming a grout composition which prevents contact by the user with the various components used to form the grout composition. Finally, it would be desirable to provide a method for forming a grout composition which insures accurate and easy measurement of the quantities of the components used to form the grout composition.

SUMMARY OF THE INVENTION

The present invention comprises a method for forming a grout composition from multiple components. A pre-determined quantity of a first reactable component is placed in a mixing tank along with pre-determined quantities of water and a first catalyst. A second catalyst is mixed with a pre-determined quantity of water in a second mixing tank. The aqueous solutions in the first and second mixing tanks are combined in a mixing chamber which causes a polymerization-cross-linking reaction of the first component and results in gelation of the first component as the grout composition is injected about an object to be sealed or injected into the soil.

In a preferred embodiment, the first component comprises an acrylamide mixture of two organic monomers, namely, acrylamide and N, N-Methlynenebisacrylamide. The first catalyst is preferably an activator, such as triethanolamine. The second catalyst comprises ammonium persulfate which triggers the polymerization reaction of the acrylamide mixture.

According to the method of forming the grout composition of the present invention, pre-determined, measured quantities of the acrylamide mixture are initially placed in water soluable containers or bags. Such containers, as is conventially known, dissolve upon contact with water. The use of such water soluable containers to house the acrylamide mixture provides several advantages since contact between the user and the acrylamide mixture is prevented which heretofore has required the use of respirators, rubber gloves and other special handling percautions due to the toxicity and harmful characteristics of the acrylamide mixture.

Further, a selected number of the water soluable containers containing the acrylamide mixture need only be added to the first mixing tank. This insures accurate and easy measurement of the desired quantity of the acrylamide mixture since individual measurement of the required quantity of the powdered acrylamide mixture is eliminated. Thus, a grout compound for sealing leaks, defects, etc. in objects, such as underground pipes and for soil stabilization purposes can be easily and quickly formed without the inherent dangers associated with human contact in the use of the highly toxic acrylamide mixture.

BRIEF DESCRIPTION OF THE DRAWING

The various features, advantages and uses of the present invention will become more apparent by referring to the following detailed description and drawing in which the sole FIGURE is a pictorial representation of a method for forming a grout composition in accordance with the teachings of the present invention.

DESCRIPTION OF THE PREFERRED EMBODIMENTS

The present invention, as shown in the drawing, comprises a method for forming a grout composition from multiple components, each of which is mixed in pre-determined quantities with water prior to complete combination or mixing to form a semi-solid or gelled grout composition.

According to the present method, the grout composition is formed by adding a first component to a mixing tank. Preferably, the first component 10 comprises an acrylamide mixture which is a mixture of two organic monomers, namely acrylamide and N, N-Methlynenebisacrylamide. When a dilute aqueous solution of the acrylamide mixture is properly catalyized, gelation occurs by a polymerization-cross-linking reaction to form a semi-solid gel which is useful in sealing leaks, defects or holes in objects, such as underground pipes.

For safety in handling the highly toxic acrylamide mixture 10, a pre-determined quantity of the acrylamide mixture is initially placed in a water soluable container 12. As is well known, such containers are formed from a thin-walled plastic film which is readily soluable in water. Examples of such plastic films which may be used to form the water soluable containers 12 include polyvinyl alcohol or polyvinyl pyrrolidone.

The size of the container 12 and the quantity of the acrylamide mixture 10 contained therein may be varied as necessary in order to use any pre-determined quantity of the acrylamide mixture 10 in forming the grout composition. Thus, unit quantities of the acrylamide mixture 10 may be disposed within the water soluable containers 12 and one or more of the containers 12 used to form the grout composition depending on the amount of grout composition needed.

According to the present method, the pre-determined quantity of the first component or acrylamide mixture 10 is added to a first mixing tank 14 along with a pre-determined quantity of water. A second component 16, such as a first catalyst, is added to the first mixing tank 14 and acts as an activator for the polymerization-cross-linking reaction, as described in greater detail hereafter. Preferrably, the second component or catalyst 16 is added in an amount between 0.5% and 2.5% of the total batch weight. Preferrably, the first catalyst comprises triethanolamine. Other catalysts, such as B-Dimethylaminopropionitrle may also be used. The acrylamide mixture 10, water and first catalyst 16 are throughly mixed within the first mixing tank 14 to form a dilute aqueous solution.

A third component 18, such as a second catalyst, is added to a second mixing tank 20 along with a pre-determined quantity of water to form a dilute aqueous solution. According to a preferred embodiment, the second catalyst 18 comprises ammonium persulfate; although sodium persulfate may also be utilized as well as other conventional reactive catalysts.

In the preferred embodiment, the ammonium persulfate catalyst 18 acts as a strong oxidizing salt and is used as an initiator to trigger the polymerization-cross-linking reaction of the acrylamide mixture 10. Preferrably, the second catalyst 18 or ammonium persulfate is added in a quantity between 0.5% to 3.0% of the total batch weight.

The second catalyst 18, which is typically in a finely-divided powder form, may be added directly to the second mixing tank 20 in the required amount. Preferrably, however, pre-determined unit quantities of the second catalyst 18 may be initially disposed in water soluable containers or bags in the same manner as the acrylamide mixture 10 for ease in formulating the grout composition. A pre-determined number of the containers of the second catalyst 18 may then be added to the second mixing tank 20.

The aqueous solutions in the first and second mixing tanks 14 and 20 are pumped through conduits by a positive displacement, dual stream pump 22 to a manifold or mixing chamber 24. The addition of the second catalyst 18 to the acrylamide mixture 10 in the mixing chamber initiates the polymerization-cross-linking reaction of the acrylamide mixture 10, with the gellation time being controlled by the weight percent of the first and/or second catalyst 16 and 18, respectively, as well as the temperature of the water added to the first and second mixing tanks 14 and 20.

Alternately, in place of the pump 22, the first and second mixing tanks 14 and 20 may be pressurized so as to output the contents thereof under pressure to the mixing chamber or manifold 24.

In order to provide a better understanding of the present invention, an example of one mixture of a grout composition will now be described. In order to form a 20 gallon batch of grout composition, 16.7 pounds of the acrylamide mixture 10 are added to the first mixing tank 14 along with 9 gallons of water and 32 ounces of the first catalyst 16. Three pounds of the second catalyst 18 are added to the second mixing tank 20 along with 10 gallons of water. The mixture of the contents of the first and second mixing chambers 14 and 20 in the manifold 24 will create 20 gallons of grout composition. With the water having a temperature of 60° F., the polymerization-cross-linking reaction of the acrylamide mixture 10 will take 30 seconds to convert the acrylamide mixture 10 into a semi-solid gel.

Thus, there has been described a unique method for forming a grout composition which enables the use of a highly toxic component without danger to the user. The highly toxic component, such as an acrylamide mixture, is initially disposed in pre-measured quantities in water soluable containers which are merely mixed in the requisite number along with water and a first catalyst in a first mixing tank. A second catalyst is mixed with water to a second mixture tank and the contents of both tanks are combined in a mixing chamber to cause a polymerization-cross-linking reaction of the acrylamide mixture which converts the acrylamide mixture into a semi-solid gel which is useful in sealing leaks, defects, or holes in various objects, such as underground pipes, or to stabilize loose soil. Furthermore, by using pre-measured quantities of the components of the grouting composition and disposing such unit quantities in water soluable containers, various amounts of the grout ingredients can be easily and accurately and safely formed since the user need only add a pre-determined number of the water soluable containers to the mixing tanks and is not required to individually measure the quantity of each component by hand and risk contact with toxic materials.

What is claimed is:

1. A method for forming a grout composition from multiple components comprising the steps of:
    placing a pre-determined quantity of a first component in a water soluble container;
    mixing a pre-determined number of the water soluable containers containing the first component with water in a first mixing tank;
    mixing a pre-determined quantity of a first catalyst with the water and the first component in the first mixing tank;
    mixing a pre-determined quantity of a second catalyst with water in a second mixing tank; and
    combining the solutions within the first and second mixing tanks to cause a polymerization-cross linking reaction of the first component such that the first components solidify.

2. The method of claim 1 further including the step of:
    placing a pre-determined quantity of the second catalyst in a water soluble container.

3. The method of claim 1 where the first component comprises an acrylamide mixture of acrylamide and N, N-Methlynenebisacrylamide.

4. The method of claim 1 wherein the first catalyst comprises triethanolamine.

5. The method of claim 1 wherein the second catalyst comprises ammonium persulfate.

6. The method of claim 1 further comprising the step of pumping the aqueous solution of the first component, the first catalyst and water in the first mixing tank and the aqueous solution of the second catalyst and water in the second mixing tank into a mixing chamber to initiate the polymerization-cross-linking reaction of the first component.

7. The method of claim 1 further comprising the step of pressurizing the first mixing tank and the second mixing tank and conducting the solutions within the first and second mixing tanks into a mixing chamber to initiate the polymerization-cross-linking reation of the first component.

* * * * *